US008337160B2

(12) United States Patent
Uehara

(10) Patent No.: US 8,337,160 B2
(45) Date of Patent: Dec. 25, 2012

(54) HIGH EFFICIENCY TURBINE SYSTEM

(75) Inventor: Yasuo Uehara, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 558 days.

(21) Appl. No.: 12/581,763

(22) Filed: Oct. 19, 2009

(65) Prior Publication Data

US 2011/0091311 A1 Apr. 21, 2011

(51) Int. Cl.
*F03D 1/04* (2006.01)

(52) U.S. Cl. ........................................ 416/189; 415/220

(58) Field of Classification Search .................. 415/228, 415/220; 416/189, 192, 193 R See application file for complete search history.

(56) References Cited

U.S. PATENT DOCUMENTS 3,578,264 A * 5/1971 Kuethe ....................... 244/200.1
4,075,500 A 2/1978 Oman et al.
4,776,755 A * 10/1988 Bjorkestam et al. ....... 415/121.2
4,926,630 A 5/1990 Shekleton
5,046,919 A 9/1991 Wulf
5,078,628 A * 1/1992 Garis, Jr. ........................... 440/6
5,184,459 A * 2/1993 McAndrews ................ 60/226.3
6,168,373 B1 * 1/2001 Vauthier ........................... 415/7
6,502,383 B1 * 1/2003 Janardan et al. ............. 60/226.1
6,540,482 B2 * 4/2003 Irie et al. ....................... 415/221
7,018,166 B2 3/2006 Gaskell
7,218,011 B2 5/2007 Hiel et al.
7,354,245 B2 4/2008 Baba
7,370,466 B2 5/2008 Cai
7,735,601 B1 * 6/2010 Stieger et al. ................. 181/213
8,021,100 B2 * 9/2011 Presz et al. ..................... 415/4.3
2008/0061559 A1 3/2008 Hirshberg
2009/0097964 A1 4/2009 Presz, Jr. et al.
2011/0148117 A1 * 6/2011 Bailey ............................. 290/52

OTHER PUBLICATIONS

Ono, Shinichi, "Measurement of Flow Field Around a Wind Turbine with a Compact-type Brimmed Diffuse by a Particle Image Velocimetry", Advanced Engineering Faculty of Production of Construction Systems, pp. 1-6, (Japanese w/English Abstract).

* cited by examiner

*Primary Examiner* — Ninh H Nguyen
*Assistant Examiner* — Liam McDowell
(74) *Attorney, Agent, or Firm* — Snell & Wilmer, LLP

(57) ABSTRACT

A high efficiency turbine system which can increase a pressure differential between an upstream location and a downstream location. The turbine system includes a propeller attached to a shaft, which can both be located in a shroud. The shroud includes a projection, such as a brim, which protrudes inward and/or outward from the shroud. The projection includes brim units arranged asymmetrically and/or in repeating patterns to generate various vortex and swirl patterns. The brim units can have a different size, shape, width, and/or height than an adjacent brim unit. The brim units can be arranged in a non-parallel manner and can be rotatable. Furthermore, the brim units can form brim groups which can be arranged asymmetrically and/or in repeating patterns to generate various swirl patterns. The turbine system can also be used in a renewable energy system, which can be used to power electronic devices.

20 Claims, 7 Drawing Sheets

HIGH EFFICIENCY TURBINE SYSTEM

BACKGROUND

1. Field

The present invention relates to a high efficiency turbine system and more specifically a high efficiency turbine system which can increase a pressure differential between an upstream location and a downstream location.

2. Description of the Related Art

A conventional turbine system includes a propeller that rotates on a shaft. The propeller is rotated by fluids passing from an upstream location to a downstream location, or the propeller rotates to push fluids from the upstream location to the downstream location. However, the rotation of the propellers can be inefficient since the rotation of the propeller may be inhibited by an inadequate pressure differential between the upstream location and the downstream location.

Thus, there is a need for a high efficiency turbine system which can increase a pressure differential between an upstream location and a downstream location.

SUMMARY

The present invention is a high efficiency turbine system which can increase a pressure differential between an upstream location and a downstream location. The turbine system can include a propeller attached to a shaft. The propeller and shaft can be located in a shroud. The shroud can include a projection, such as a brim, which protrudes inward and/or outward from the shroud.

The projection can include brim units which can be arranged asymmetrically and/or in repeating patterns to generate various vortex and swirl patterns. In the asymmetrical arrangement, each of the brim units can have a different size, shape, width, and/or height than an adjacent brim unit. The brim units can also be arranged in a non-parallel manner and can be rotatable. The rotation of the brim units can be controlled by a processor. Furthermore, the brim units can form brim groups which can also be arranged asymmetrically and/or in repeating patterns to generate various vortex and swirl patterns.

The projection, the brim units, and/or the brim groups can generate various swirl patterns and/or vortex patterns which can decrease the pressure in the downstream location, thereby increasing the pressure differential between the upstream location and the downstream location. The increased pressure differential can increase the efficiency of the turbine system and the propeller and/or the shaft can rotate at a faster rate and/or utilize less energy to rotate. The turbine system can also be used in a renewable energy system, which can be used to power electronic devices.

In one embodiment, the present invention is a turbine system including a shroud, a propeller located inside the shroud, and an asymmetrical projection located on the shroud.

In another embodiment, the present invention is a turbine system including a shroud, a propeller located inside the shroud, and a plurality of asymmetrical brim groups located on the shroud, each of the plurality of asymmetrical brim groups including a first asymmetrical brim unit and a second asymmetrical brim unit adjacent the first asymmetrical brim unit.

In yet another embodiment, the present invention is a renewable energy system including a shroud, a propeller located inside the shroud, and a plurality of asymmetrical brim groups located on the shroud and formed in a repeating pattern, each of the plurality of asymmetrical brim groups including a first asymmetrical brim unit and a second asymmetrical brim unit adjacent the first asymmetrical brim unit.

BRIEF DESCRIPTION OF THE DRAWINGS

The features, obstacles, and advantages of the present invention will become more apparent from the detailed description set forth below when taken in conjunction with the drawings, wherein.

DETAILED DESCRIPTION

Apparatus, systems and methods that implement the embodiments of the various features of the present invention will now be described with reference to the drawings. The drawings and the associated descriptions are provided to illustrate some embodiments of the present invention and not to limit the scope of the present invention. Throughout the drawings, reference numbers are re-used to indicate correspondence between referenced elements.

Figure 1:
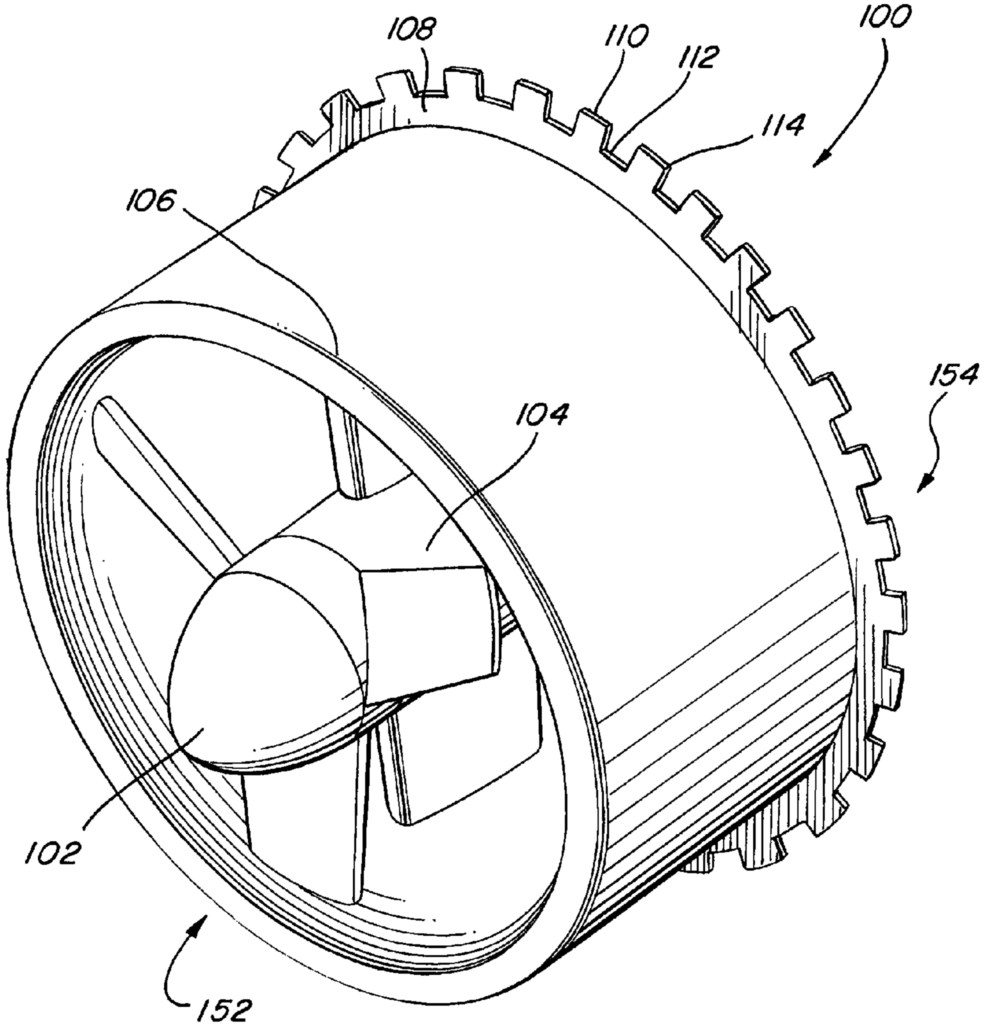
FIG. 1 is a perspective view of a turbine system according to an embodiment of the present invention.

As seen in FIG. 1, the present invention includes a turbine system 100. The turbine system 100 includes a propeller 102, a shaft 104, a shroud 106, and a projection 108. The propeller 102 is connected to the shaft 104 and the propeller 102 rotates the shaft 104, and/or the shaft 104 rotates the propeller 102. The fluid then flows from an upstream position 152 to a downstream position 154. The fluid can be, for example, gas, liquid, and/or steam. The propeller 102 and the shaft 104 are located inside the shroud 106. The shroud 106 protects the propeller 102 and the shaft 104 from damage. The shroud 106 also limits flow vector of fluid flowing through the propeller 102 so that the fluid flows downstream more efficiently.

The projection 108 is located on one end of the shroud 106. The projection 108 can be, for example, an asymmetrical projection. The projection 108 can also be, for example, a brim, such as an asymmetrical brim. The projection 108 generates vortexes along the downstream portion of the turbine system 100. The vortexes introduce a lower pressure section behind the turbine system 100 at, for example, the downstream location 154. By using an asymmetrical projection instead of a symmetrical projection, the present invention can generate larger vortexes which can further decrease the pressure in the downstream location 154. The pressure at the upstream location 152 can, for example, remain relatively stagnant or decrease at a smaller amount than the pressure decrease in the downstream location 154. Therefore, the decrease in pressure at the downstream location 154 improves an efficiency of the turbine system 100 because there is now a greater pressure differential between the downstream location 154 and the upstream location 152.

Due to the increased pressure differential, more of the fluid will gravitate from the upstream location 152 to the downstream location 154. Thus, the propeller 102 will be able to either force more fluid downstream, or the fluid will force the propeller 102 to rotate faster due to the increase velocity of the fluid moving downstream.

Figure 2:
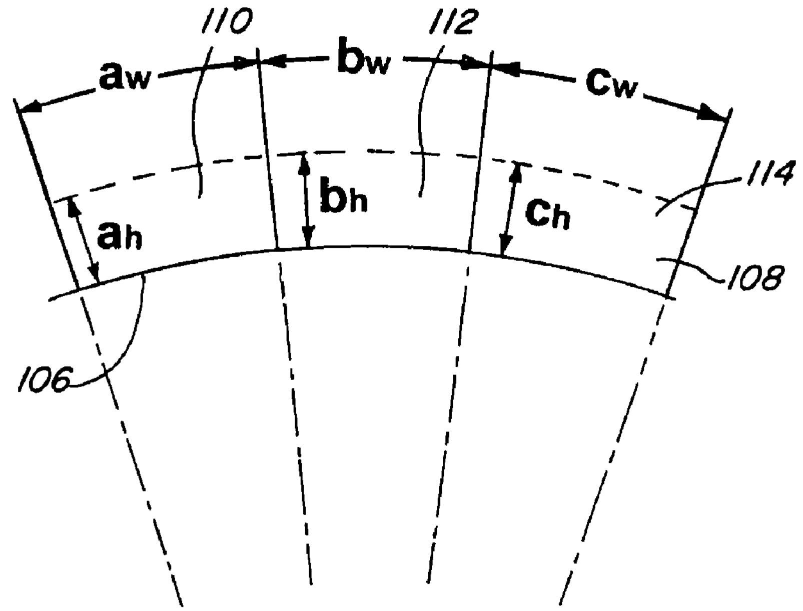
FIG. 2 depicts a projection on a shroud of a turbine system according to an embodiment of the present invention.

The projection 108 includes a plurality of brim units such as brim units 110, 112, and 114. As seen in FIG. 2, the brim unit 110 can have a height of $a_h$ and a width of $a_w$. The brim unit 112 can have a height of $b_h$ and a width of $b_w$. The brim unit 114 can have a height of $c_h$ and a width of $c_w$. Furthermore, $a_h$, $b_h$, and $c_h$, can have different values. Likewise, $a_w$, $b_w$, and $c_w$ can have different values. Also, the brim units 110, 112, and 114 can have different lengths and/or shapes.

Figure 3:
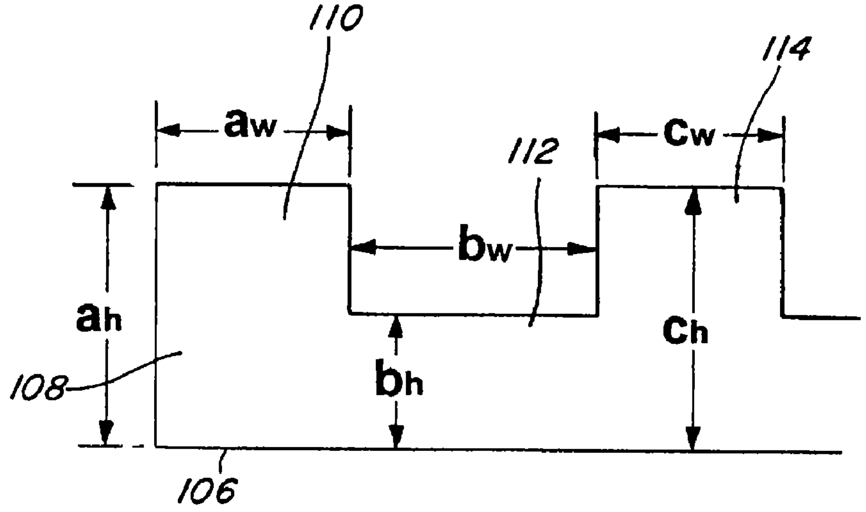
FIG. 3 depicts a projection on a shroud of a turbine system according to an embodiment of the present invention.

FIG. 3 depicts one embodiment of the brim units 110, 112, and 114. In FIG. 3, the brim units 110, 112, and 114 are asymmetrical such that a brim unit has a different size, shape, and/or orientation than an adjacent brim unit. Furthermore, in FIG. 3, the brim units 110, 112, and 114 are shown to be on a flat rather than circular shroud. However, the brim units 110, 112, and 114 can be on a shroud of any shape. In FIG. 3, the brim units 110, 112, and 114 are arranged in an asymmetrical pattern. For example, the brim unit 110 has a different height than the brim unit 112. The brim unit 112 also has a different height than the brim units 110 and 114. In one embodiment, the brim units 110 and 112 can form a brim group. The brim group can then be repeated throughout the projection 108. Thus, the projection 108 can be composed of a plurality of brim groups, each brim group comprising the brim units 110 and 112.

Figure 4:
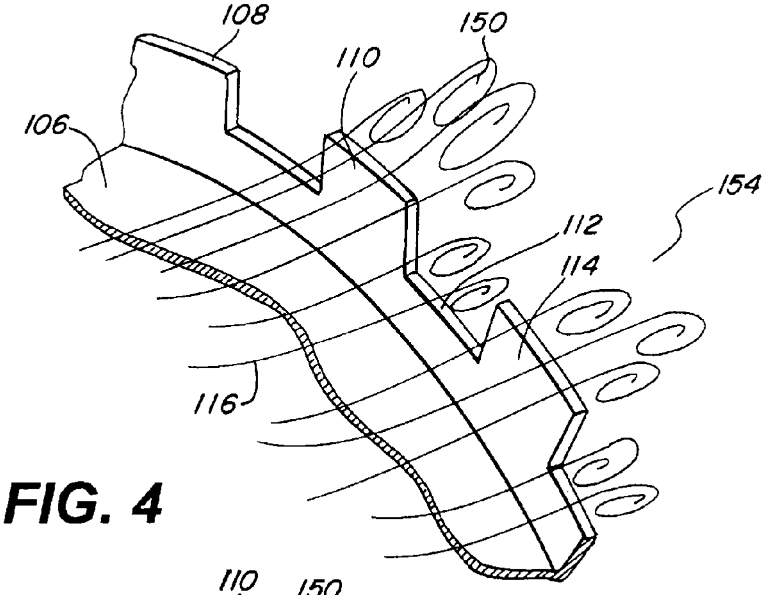
FIG. 4 is a perspective view of a projection on a shroud of a turbine system according to an embodiment of the present invention.

FIG. 4 depicts a fluid 116 flowing through the shroud 106 and the projection 108 to the downstream position 154 to form vortexes 150. The fluid 116 can be, for example, gas, liquid, and/or steam. As can be seen, due to the asymmetrical nature of the projection 108, multiple vortexes 150 are created. The multiple vortexes 150 generate a stronger swirl in the downstream position 154. The stronger swirl in the downstream position 154 reduces the pressure in the downstream position 154. Since the pressure in the downstream position 154 is lower than the pressure in the upstream position 152, fluid 116 flows faster from the upstream position 152 to the downstream position 154. This reduces a strain on the propeller 102 and the shaft 104 and can, for example, make the propeller 102 and the shaft 104 function more efficiently.

Figure 5:
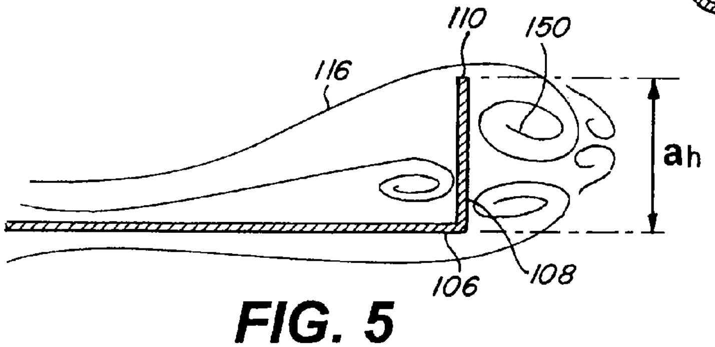
FIG. 5 depicts a brim unit of a turbine system according to an embodiment of the present invention.
Figure 6:
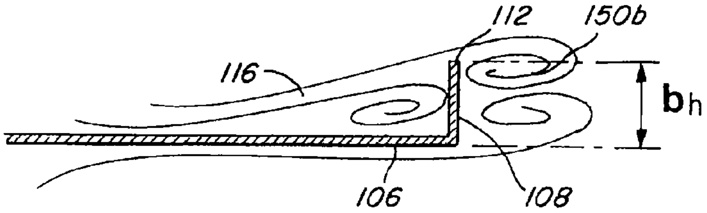
FIG. 6 depicts a brim unit of a turbine system according to an embodiment of the present invention.

FIG. 5 depicts the fluid 116 flowing through the brim unit 110 the vortex 150*a* generated by the brim unit 110 while FIG. 6 depicts the fluid 116 flowing through the brim unit 112 and the vortex 150*b* generated by the brim unit 112. As can be seen in FIGS. 5 and 6, the brim units 110 and 116 generate different vortexes. The vortex 150*a* generated by the brim unit 110 is larger than the vortex 150*b* generated by the brim unit 112.

Figure 7:
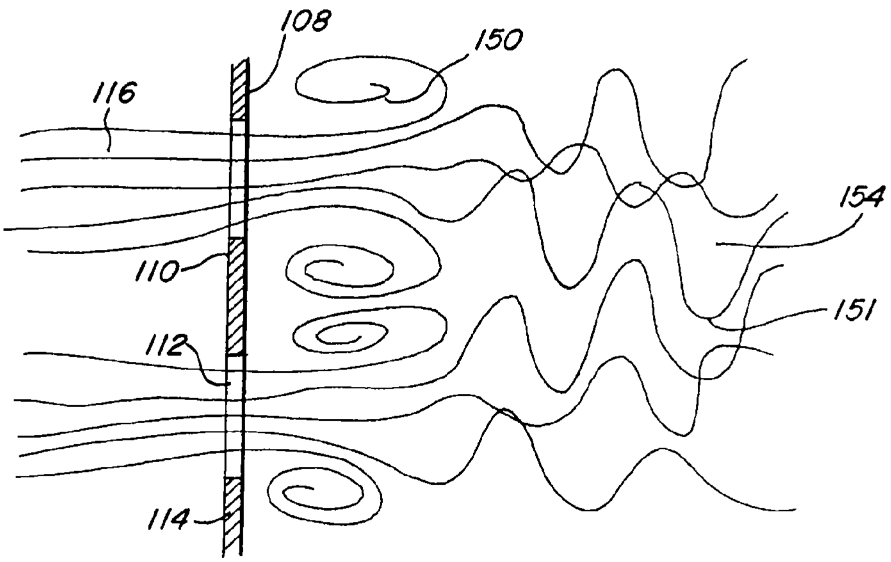
FIG. 7 depicts a projection on a shroud of a turbine system generating vortexes and swirls according to an embodiment of the present invention.

FIG. 7 is an overview of the projection 108 depicted, for example, in FIGS. 3 and 4. As can be seen in FIG. 7, the fluid 116 flows through the projection 108 to generate the vortex 150. The asymmetrical formation of the vortex 150 generates strong swirls 151, which can reduce the pressure at the downstream location 154. In FIG. 7, a cross-sectional view of the swirls 151 is shown.

Figure 8:
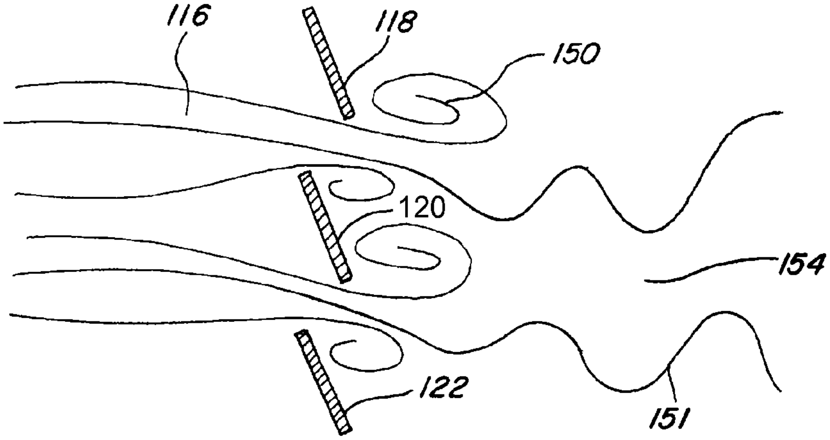
FIG. 8 depicts a projection on a shroud of a turbine system generating vortexes and swirls according to an embodiment of the present invention.

In FIG. 8, the brim units 118, 120, and 122 are rotatable. Thus, the brim units 118, 120, and 122 can change its angle of attack with respect to the fluid 116. However, the brim units 118, 120, and 122 need not rotate at the same time, and can, for example, be rotated individually. The varied positioning of the brim units 118, 120, and 122 through the rotation of the brim units 118, 120, and 122 can generate different types of vortexes 150 with different locations, shapes, and intensity. The asymmetry of the vortex 150 can generate the swirls 151. The variance of the vortexes 150 generated can influence the swirls 151 and the pressure at the downstream location 154. For example, the variance of the vortexes 150 generated can affect the swirls 151 to decrease the pressure at the downstream location 154. The decrease in the pressure at the downstream location 154 can increase the pressure differential between the downstream location 154 and the upstream location 152, thereby improving a performance of the turbine system 100. However, in one embodiment, where it is desirable to increase the pressure at the downstream location 154, the variance of the vortexes 150 generated can affect the swirls 151 to increase the pressure at the downstream location 154.

Figure 9:
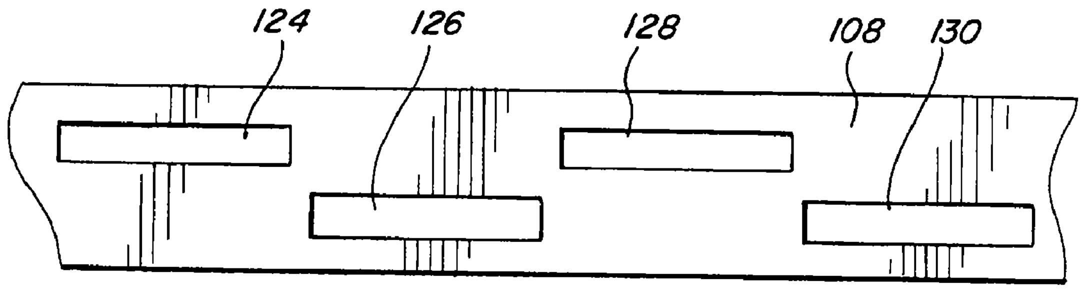
FIG. 9 is a portion of a projection on a shroud of a turbine system according to an embodiment of the present invention.

FIG. 9 depicts an alternate embodiment of the projection 108. In FIG. 9, the brim units 124, 126, 128, and 130 are arranged in an asymmetrical pattern. The brim units 124, 126, 128, and 130 are staggered. Furthermore, brim units 124 and 126 can form a first brim group while brim units 128 and 130 can form a second brim group. In one embodiment, the brim groups are arranged in a repetition pattern and the first brim group and the second brim group can be substantially identical.

Figure 10:
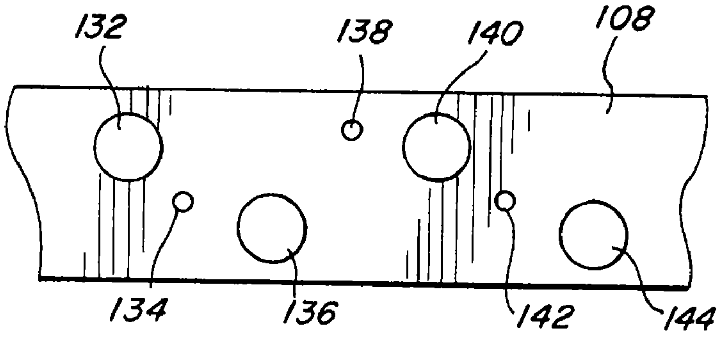
FIG. 10 is a portion of a projection on a shroud of a turbine system according to an embodiment of the present invention.

FIG. 10 depicts another embodiment of the projection 108. In FIG. 10, the brim units 132, 134, 136, 138, 140, 142, and 144 are circular or spherical projections from the projection 108. The brim units 132, 134, 136, 138, 140, 142, and 144 are arranged in an asymmetrical pattern. For example, the larger brim units 132, 136, 140, and 144 are adjacent the smaller brim units 134, 138, and 142. The larger brim units 132, 136, 140, and 144 can have, for example a larger diameter than the smaller brim units 134, 138, and 142.

Figure 11:
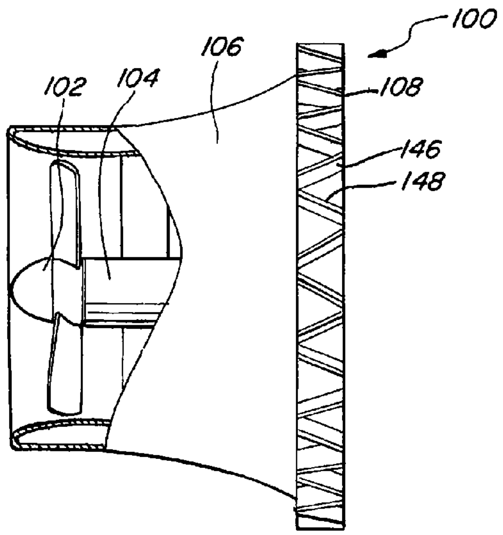
FIG. 11 is a turbine system according to an embodiment of the present invention.
Figure 12:
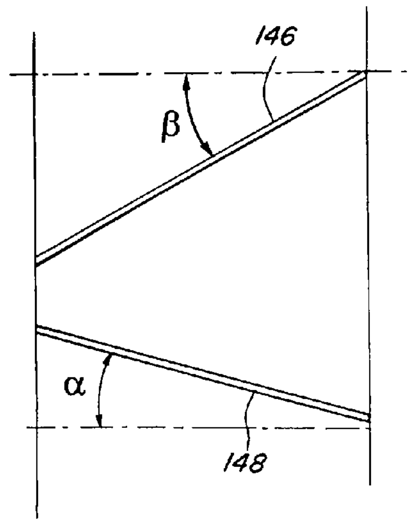
FIG. 12 depicts brim units of a turbine system according to an embodiment of the present invention.

FIGS. 11 and 12 depict another embodiment of the turbine system 100 and the brim unit 108. As seen in FIG. 11, the projection 108 includes brim units 146 and 148, which are arranged in an asymmetrical pattern. Furthermore, as seen in FIG. 12, the brim units are arranged in a non-parallel manner. The brim unit 146 forms an angle $\beta$ with respect to a line perpendicular to the projection 108 and the brim unit 148 forms an angle $\alpha$ with respect to a line perpendicular to the projection 108. The angle $\alpha$ and $\beta$ can be substantially equal or different. The brim units 146 and 148 can be one of the brim groups in the brim unit 108. The brim groups can also be arranged in a repetition pattern.

Figure 13:
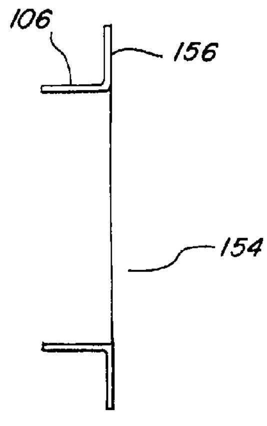
FIG. 13 depicts a projection protruding from a shroud according to an embodiment of the present invention.
Figure 14:
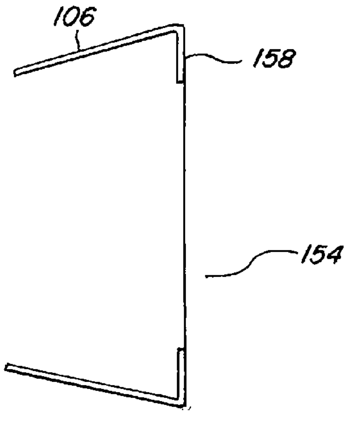
FIG. 14 depicts a projection protruding from a shroud according to an embodiment of the present invention.
Figure 15:
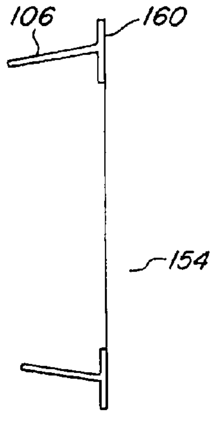
FIG. 15 depicts a projection protruding from a shroud according to an embodiment of the present invention.

The projection can protrude in an inward and/or outward direction from the shroud 106. For example, in one embodiment, a projection 156 protrudes in an outward direction from the shroud 106 as seen in FIG. 13. In another embodiment, a projection 158 protrudes in an inward direction from the shroud 106 as seen in FIG. 14. In yet another embodiment, the projection 160 protrudes in an inward and an outward direction from the shroud 106 as seen in FIG. 15. The variation in whether the projection protrudes in an inward and/or outward direction from the shroud 106 can, for example, vary the pressure at the downstream location 154.

Figure 16:
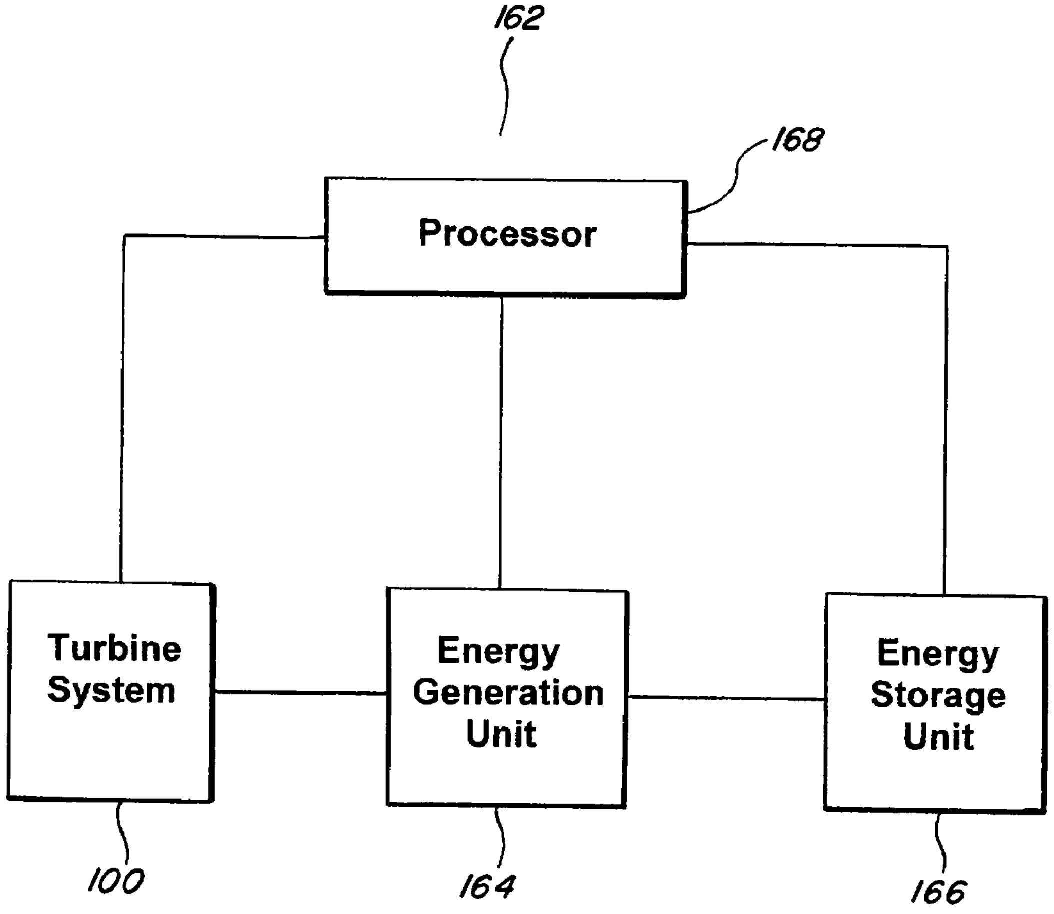
FIG. 16 depicts a renewable energy system according to an embodiment of the present invention.

In another embodiment, the present invention is a renewable energy system 162 as shown, for example, in FIG. 16. The renewable energy system 162 can include, for example, the turbine system 100, an energy generation unit 164, an energy storage unit 166, and/or a processor 168. The renewable energy system 162 can be, for example, a wind turbine system, a hydro turbine system, a steam turbine system, or any other type of renewable energy system which can use the turbine system 100. The propeller 102 (FIG. 1) and the shaft 104 (FIG. 1) can rotate due to the movement of the fluid 116 (FIG. 4).

The energy generation unit 164 can use the rotation of the shaft 104 to generate energy which can be transferred to the energy storage unit 166. The energy storage unit 166 can be, for example, a battery. The energy storage unit 166 can be used to power electronic devices connected to the energy storage unit 166. The processor 168 can monitor the energy generation in the energy generation unit 164 and/or the energy stored in the energy storage unit 166. The processor 168 can rotate, for example, the brim units in the brim, such as the brim units 118, 120, and/or 122. The increase in pressure differential between the downstream location and the upstream location can allow the propeller 102 and the shaft 104 to rotate at a faster rate, allowing the energy generation unit 164 to generate more energy.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A turbine system comprising:

a shroud;

a propeller located inside the shroud and having an axis of rotation; and an asymmetrical projection continuously protruding from a perimeter of the shroud and substantially perpendicular to the axis of rotation of the propeller.

2. The system of claim 1, wherein the asymmetrical projection includes a plurality of asymmetrical brim units.

3. The system of claim 2, wherein each of the asymmetrical brim units is arranged in a non-parallel manner to an adjacent asymmetrical brim unit.

4. The system of claim 2, wherein each of the asymmetrical brim units has a different shape, height, width, or length than an adjacent asymmetrical brim unit.

5. The system of claim 2, wherein the asymmetrical brim units protrude from the shroud in an asymmetrical and repeating manner.

6. The system of claim 2, wherein each of the asymmetrical brim units is rotatable about an axis substantially perpendicular to the perimeter of the shroud.

7. The system of claim 1, wherein the asymmetrical projection includes a plurality of asymmetrical brim groups arranged in a repetition pattern, wherein each of the plurality of asymmetrical brim groups includes a first asymmetrical brim unit and a second asymmetrical brim unit adjacent the first asymmetrical brim unit.

8. The system of claim 1, wherein the asymmetrical projection protrudes in an outward direction from the perimeter of the shroud.

9. The system of claim 1, wherein the asymmetrical projection protrudes in an inward direction from the perimeter of the shroud.

10. The system of claim 1, wherein the asymmetrical projection protrudes in an outward and an inward direction from the perimeter of the shroud.

11. A turbine system comprising:

a shroud;

a propeller located inside the shroud and having an axis of rotation; and an asymmetrical projection continuously protruding from a perimeter of the shroud and substantially perpendicular to the axis of rotation of the propeller, wherein the asymmetrical projection includes a plurality of asymmetrical brim groups, each of the plurality of asymmetrical brim groups including a first asymmetrical brim unit and a second asymmetrical brim unit adjacent the first asymmetrical brim unit.

12. The system of claim 11, wherein the plurality of asymmetrical brim groups are formed in repeating pattern.

13. The system of claim 11, wherein the first asymmetrical brim unit and the second asymmetrical brim unit are rotatable about an axis substantially perpendicular to the perimeter of the shroud.

14. The system of claim 11, wherein the first asymmetrical brim unit and the second asymmetrical brim unit are arranged in a non-parallel manner.

15. The system of claim 11, wherein the first asymmetrical brim unit and the second asymmetrical brim unit have different shapes.

16. The system of claim 11, wherein the first asymmetrical brim unit and the second asymmetrical brim unit have different heights.

17. The system of claim 11, wherein the first asymmetrical brim unit and the second asymmetrical brim unit have different widths or lengths.

18. A renewable energy system comprising:

a shroud;

a propeller located inside the shroud and having an axis of rotation; and an asymmetrical projection continuously protruding from a perimeter of the shroud and substantially perpendicular to the axis of rotation of the propeller, wherein the asymmetrical projection includes a plurality of asymmetrical brim groups formed in a repeating pattern, each of the plurality of asymmetrical brim groups including a first asymmetrical brim unit and a second asymmetrical brim unit adjacent the first asymmetrical brim unit.

19. The system of claim 18, wherein the first asymmetrical brim unit and the second asymmetrical brim unit are rotatable about an axis substantially perpendicular to the perimeter of the shroud.

20. The system of claim 18, wherein the first asymmetrical brim unit and the second asymmetrical brim unit are arranged in a non-parallel manner and have different shapes, have different heights, have different widths, or have different lengths.

* * * * *